Jan. 9, 1940.　　　　H. W. HEM　　　　2,186,830
WEIGHING SCALE
Filed Sept. 28, 1938　　　3 Sheets-Sheet 3
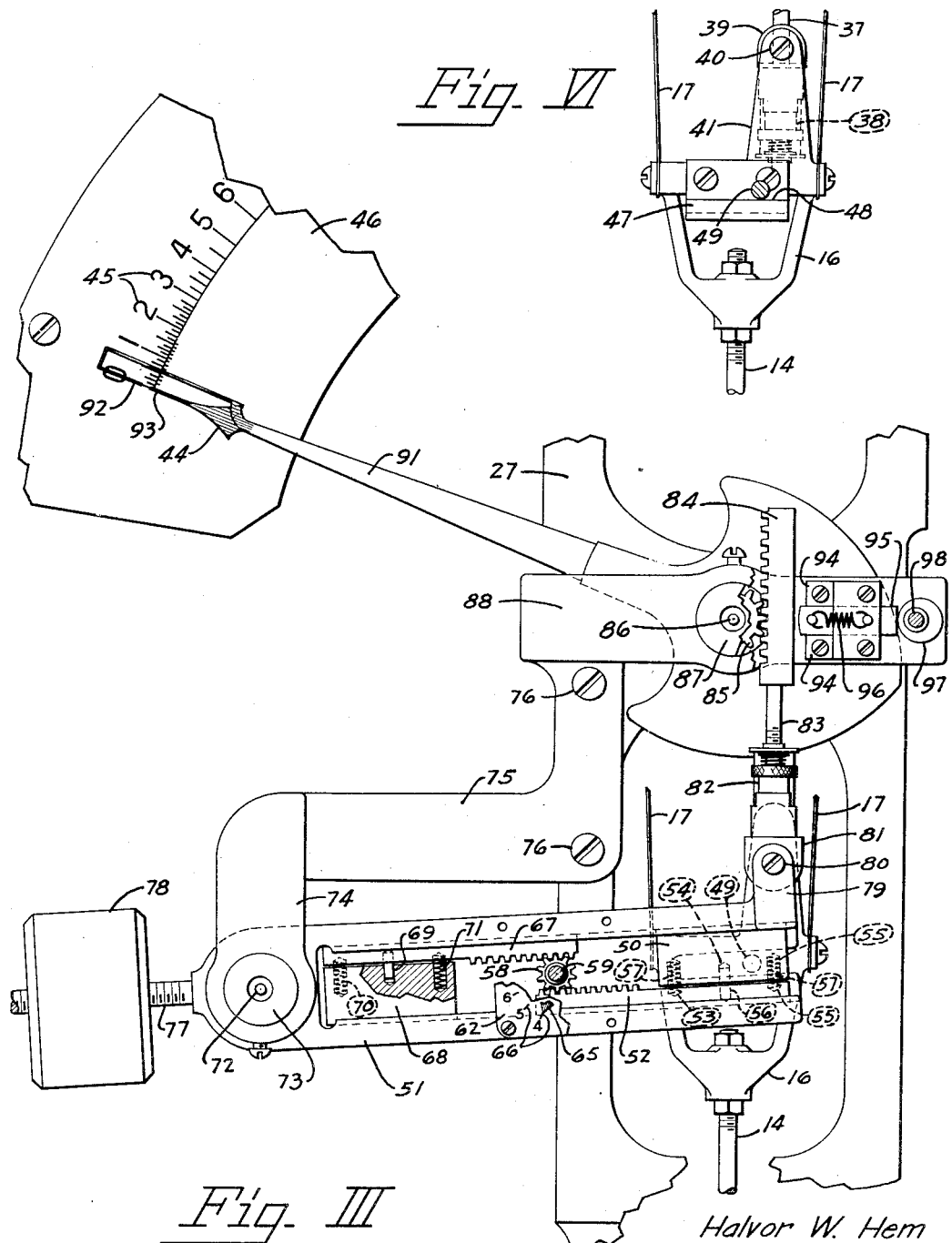
Fig. VI
Fig. III
Halvor W. Hem
INVENTOR
BY Marshall & Marshall
ATTORNEYS Patented Jan. 9, 1940

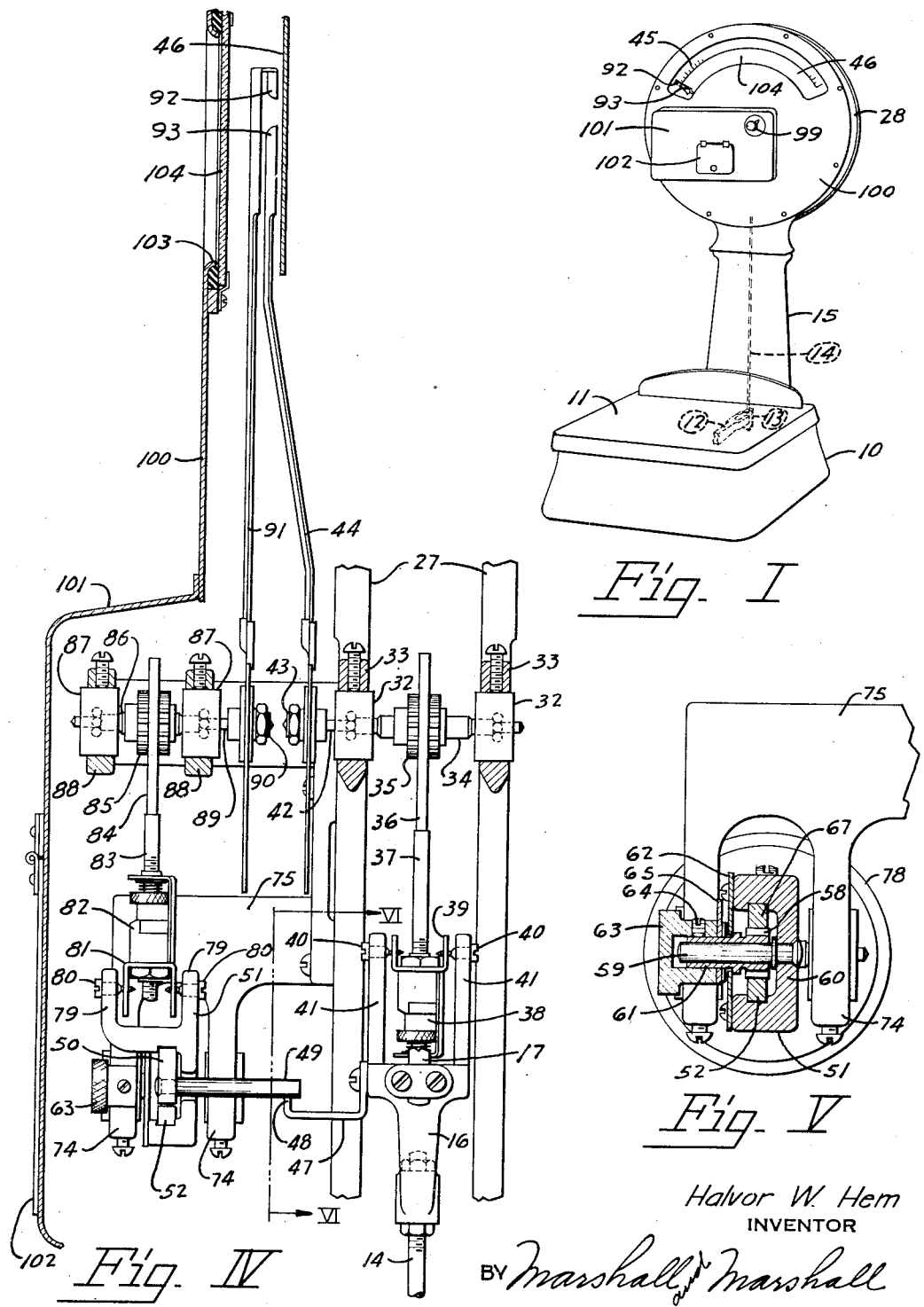

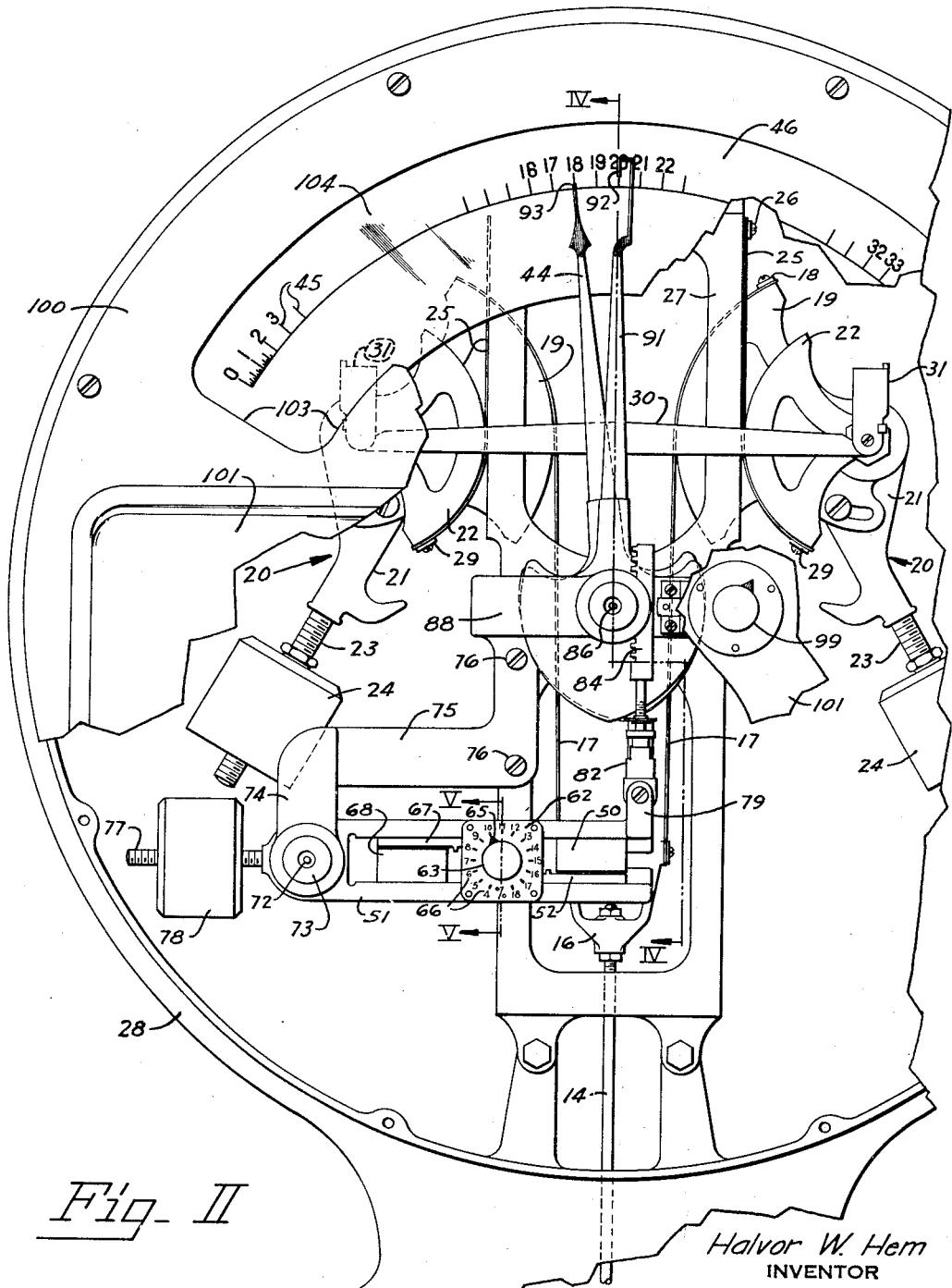
Fig. II
Halvor W. Hem
INVENTOR
BY Marshall & Marshall
ATTORNEYS

2,186,830

UNITED STATES PATENT OFFICE 2,186,830

WEIGHING SCALE

Halvor W. Hem, Toledo, Ohio, assignor to Toledo Scale Manufacturing Company, Toledo, Ohio, a corporation of New Jersey Application September 28, 1938, Serial No. 232,147

9 Claims. (Cl. 265—37)

This invention relates generally to weighing scales, and more particularly to weighing scales which are adapted to determine a percentual increase in the weight of a load. In the preservation of cuts of meats, such as hams, sides of bacon, etc., it is customary to pump a pickling and preserving medium, such as brine, into these cuts either into the cells directly through perforated needles or into the vascular system. It is essential that the amount of fluid, by weight, with which the meat is impregnated be percentual to the weight of the meat.

The principal object of the present invention is the provision of an improved weighing device for determining the weight of an unimpregnated cut of meat and indicating when a predetermined percentual amount of pickling or preserving fluid has been pumped into such cut.

Another object is the provision of an improved means whereby two indicators are actuated by the weighing mechanism.

Another object is the provision of improved means whereby one of the indicators is moved at a percentual greater rate.

A still further object is the provision of improved means for locking, and disengaging one of the indicators from the weighing mechanism.

These, and other objects and advantages will be apparent from the following description in which reference is had to the accompanying drawings, illustrating a preferred embodiment of the invention and in which similar reference numerals refer to similar parts throughout the several views.

In the drawings:

Fig. I is a perspective view of a scale embodying the invention.

Fig. II is an enlarged fragmentary front elevational view of the load counterbalancing and percentage determining means.

Fig. III is an enlarged fragmentary elevational view of the means for percentually actuating one of the indicators.

Fig. IV is an enlarged section through the mechanism substantially along the line IV—IV of Fig. II.

Fig. V is an enlarged sectional view along the line V—V of Fig. II; and,

Fig. VI is an enlarged view of the equalizer and the means for attaching the scale indicator driving rack substantially as seen along the line VI—VI of Fig. IV.

Referring to the drawings in detail:

The scale comprises a base 10 containing the usual load lever system upon which a platform 11 is pivotally supported. A nose 12 of this lever system pivotally engages a stirrup 13 on the lower end of a rod 14, which extends vertically upwards in the interior of a column 15 fixed to a projecting deck of the base 10. The upper end of the rod 14 is adjustably clamped to an equalizer 16 (Figs. II and VI) secured to the lower ends of flexible metallic ribbons 17. The upper ends of these ribbons 17 overlie and are fastened at 18 to arcuate faces of power sectors 19 of load counterbalancing pendulums 20. Each of these pendulums comprises, in addition to the power sector 19, a body 21, a pair of fulcrum sectors 22, a pendulum stem 23, which is studded into the body 21, and a pendulum weight 24 threaded upon the stem 23. These pendulums are fulcrumed on flexible metallic ribbons 25 whose upper ends are fastened at 26 to a sector guide 27 suitably positioned in the interior of a substantially watchcase-shaped housing 28 which surmounts the column 15. The lower ends of these ribbons are clamped at 29 to the lower ends of arcuate faces of the fulcrum sectors 22. Compensating bars 30 and yokes 31, pivotally connected to the pendulums at their center of revolution, are provided to prevent these pendulums from disengaging from the sector guide 27 when the scale is in a slight out-of-level position.

Antifriction ball bearings 32, seated in horizontally extending flanges of the sector guide 27, support ends of an indicator shaft 34 having a pinion 35 circumjacently mounted thereon. The teeth of this pinion mesh with the teeth of a rack 36 fixed to the upper end of an extension rod 37 whose lower end is threaded into the body of a rack adjustment member 38 and which is secured to a U-shaped suspension 39. So that the rack may freely engage the pinion the adjustment member 38 is pivotally suspended from trunnions of screws 40 threaded through spaced ears 41 which form a part of the equalizer 16 and extend upwardly therefrom between the two ribbons 17 which transmit the "pull" of the load on the platform 11. To an extension 42 of the shaft 34, which extends forwardly of its bearing 32, is clamped a hub 43 of a pointer or indicator 44. This pointer cooperates with a series of weight indicia 45 marked on a chart 46 stationed between the sector guide 27 and the indicator 44 in the upper portion of the housing 28.

The mechanism thus far described is well adapted to determine and indicate the weight of a load placed on the load receiver 11 within its capacity.

To accomplish the objects of the instant invention there is secured to the equalizer 16 one of the flanges of a U-shaped member 47. The upper edge of the outer flange of this member forms a track surface 48 upon which a pin 49, studded into a block 50, is slidably supported. The track surface 48 and the pin 49 are preferably highly polished so as to reduce the friction to an irreducible minimum. The upper portion of this block 50 is mounted in a machined groove of a forked lever 51 and its lower edge rests substantially upon a flat machined portion of a rack 52, which also is slidably mounted in a groove in the lower fork of this lever 51. To prevent relative movement between the block 50 and the rack 52 and lost motion, each of these two members are provided with three accurately drilled aligning holes 53, 54 and 55. A snugly fitted pin 56 is located in the two aligning holes 54. This pin prevents longitudinal displacement of the two members. Small helical compression springs 57 stationed in the holes 53 and 55 exert a pressure on the two members 50 and 52 and hold these in contact with the grooves in the upper and lower forks of the lever 51 thus taking up all lost motion. The teeth of this rack, which extends on one side of the block 50, mesh with the teeth of a pinion 58 loosely seated upon a pin 59 which is riveted to a vertical web 60 of the lever 51. A thin hub 61, which forms an integral part of the pinion 58, extends forwardly through an opening in the plate 62 fastened to the upper and lower forks of the lever 51. To the extending portion of this hub 61 is fixed a small actuating knob 63 by means of a set screw 64. For a purpose which will later become clear, an index 65 is secured to the inner end of the knob 63 so that it may cooperate with a series of indicia 66 on the plate 62. Also meshing with the teeth of this pinion 58 is a rack 67 situated in the groove in the upper fork of the lever 51 and extending in the opposite direction from the rack 52. A block 68, which is similar to the block 50 slidably seated in the groove in the lower fork, is connected to the rack in a similar manner by means of a pin 69 and springs 70 and 71. It will be seen that when the knob 63 is turned the blocks 50 and 68 move equal distances but in opposite directions, and since the weight of the block 68 is exactly that of the block 50 and the pin 49 riveted therein, the static balance of the lever 51 is not disturbed. This lever 51 fulcrumed by means of a shaft 72, which is fixed therein, in antifriction ball bearings 73 in a downwardly projecting fork 74 of a bracket 75 which is fastened by means of screws 76 to suitable bosses of the sector guide 27. To aid in establishing the static balance of the lever 51 this is provided with a boss extending on the opposite side of its fulcrum and has a threaded stem 77 studded therein and extending in the longitudinal axis of the lever upon which is adjustably mounted a balance weight 78.

The upper fork of the lever 51 adjacent its end is provided with two upwardly extending spaced ears 79 and screws 80 which, by means of trunnions on their ends, pivotally support a U-shaped member 81 to which the body of a rack adjustment 82 is fastened and threaded into this rack adjustment is an extension rod 83 of a rack 84 whose teeth mesh with the teeth of a pinion 85. This pinion is pinned to a shaft 86 mounted in antifriction ball bearings 87 in a horizontally extending fork 88 of the bracket 75. The fork 88 is so designed and positioned that the shafts 86 and 34 of the weighing mechanism are in coincidence and an extension 89 of the shaft 86, which extends inwardly towards the mechanism of the scale, has clamped thereon a hub 90 of an indicator 91. The upper end of the indicator 91 is suitably shaped so that an index point 92, which is turned downwardly, may be brought into registration with an index point 93 on the indicator 44. The points 92 and 93 are so shaped as to lie in the same vertical plane.

So that the indicator 44 may be stationarily locked, for a reason which will later become clear, the rearward arm of the fork 88 of the bracket 75 is somewhat extended and on this extension, between two guides 94, is mounted a plunger 95 which is adapted to be moved forwardly against the tension of a spring 96 by means of an eccentric 97 on a shaft 98 whose forward end is provided with a hand knob 99. The end of this plunger 95 is adapted to frictionally engage the back of the rack 84 and thus prevent movement of this rack 84 and rotation of the pinion 85.

For the purpose of enclosing the load counterbalancing mechanism and the percentual indicating mechanism, the housing 28 is provided with a plate 100 having a casing-like projection 101 in which the mechanism mounted upon the bracket 75 is located. The hand knob 99, by means of which the indicator lock is actuated, extends through the front of the casing-like projection 101 and, therefore, is operable from the exterior of the scale. The hand knob 63 is located within the casing 101 but is accessible through a hinged cover 102. An opening 103, covered by a glass plate 104, overlies the chart 46 so that the indicia 45, as well as the index points 92 and 93, are readily visible.

When a load is placed upon the platform 11 the "pull" of the load is transmitted, in the well known manner, by means of the rod 14, the equalizer 16 and the ribbons 17 to the pendulums 20. These pendulums move outwardly and upwardly upon their fulcrum ribbons 25 until their weight moment exactly counterbalances the weight moment of the load, and the rack 36 which is mounted upon the equalizer 16, with the cooperation of the pinion 35 translates the reciprocatory motion of the rod 14 into rotation of the indicator 44 which now points to that indicium in the series 45 of indicia representing the weight of this load. It is an object of this invention however, as previously stated, to also determine the amount of a substance which is to be added to the load on the platform in terms of percentage of the weight of such load. It will be seen that the pin 49, projecting inwardly from the lever 51 and resting on the track 48 of the U-shaped bracket 47 fastened to the equalizer 16, partakes of this reciprocatory motion since the lever 51 and the mechanism mounted thereon is so balanced by means of the balance weight 78 that this pin 49 normally maintains light contact with this track 48 and the rack 84 partakes of the movement of the equalizer 16 and thus translates, with the aid of the pinion 85, the reciprocatory motion of the scale into rotation of the indicator 91, cooperating with the chart 46. The distance between the point of contact of the pin 49 and the axis of the fulcrum shaft 72 of the lever 51 may be so established that the rack 84 is moved at the same rate of speed as the rack 36 so that the two indicators 44 and 91 will rotate in unison. However, it is obvious that when the distance between the pin and the fulcrum of the lever 51 is shortened the rate at which the rack 84 is moved is increased since this shortened distance causes the point of the lever 51, to which the rack 84 is pivoted, to move through a greater distance during the same interval of time. This is due to the fact that with a shorter arm and the same movement of the equalizer the angle through which the lever 51 is rocked is greater, and since the position of the rack on the lever is not changed this rack now causes the indicator to rotate through a greater angle. By properly positioning the pin 49 along the track 48 the proportions of the angles through which the indicators 44 and 91 are revolved may be varied as required within certain limits.

For example, it is desired to cure cuts of meats, such as hams, by impregnating them with pickling brine amounting to 11% of their weight. The first step in the operation is to properly position the pin 49 on the track 48 so that the travel of the indicator 91 is 11% greater than that of the indicator 44. This is accomplished by turning the knob 63 until its index 65 points to the 11% indicium on the plate 62 which is fastened to the lever 51, and visible when the cover 102 of the casing 101 is opened. A ham, weighing for example 18 lbs., is now placed upon the platform of the weighing mechanism and the indicator 44, through the means previously described, will point to the indicium in the series 45 which represents this weight. The action of the weighing mechanism in rotating the indicator 44 to the 18 lb. indicium simultaneously positions the index 92 of the hand 91 at a point corresponding to 18 lbs. plus 11% of this weight or at 19.98 lbs. in this example. The operator now turns the knob 99 which causes the plunger 95 to lock the rack 84 in this position and then, by any of the known means, injects the brine into the ham. As the brine is being injected the ham increases in weight and this increase is noted by the scale and the indicator 44 now slowly approaches the locked index 92 of the percentage hand and when the index 93 registers with the index 92 the operator interrupts the flow of the brine as the ham now contains exactly 11% of its weight, of brine.

The embodiment of the invention herein shown and described is to be regarded as illustrative only, and it is to be understood that the invention is susceptible to variation, modification and change within the spirit and scope of the subjoined claims.

Having described the invention, I claim:

1. In a device of the class described, in combination, weighing mechanism, a movable member, a member having a relatively long flat face attached to said movable member, a rack actuated by said movable member, a second rack actuated by said relatively long flat faced member, indicating means actuated by each of said racks for indicating weights of loads placed on said weighing mechanism, means whereby the indication actuated by said second rack may be caused to indicate an amount proportional to the amount indicated by said indicating means actuated by said first mentioned rack, said means comprising a lever, a fulcrum pivot for said lever, means on said lever for pivotally supporting said second rack at a fixed distance from said fulcrum pivot, a movable block secured to said lever, a pin fixed in said block for engaging said flat faced member secured to said movable member at a plurality of points variously spaced from said fulcrum pivot of said lever, manipulative means for moving said block and said pin relatively along the flat face of said flat faced member and a second block attached to said lever and actuated by said manipulative means in a direction opposed to the direction of movement of said first block for maintaining the balance of said lever.

2. In a device of the class described, in combination, weighing mechanism, a movable member, a member having a relatively long flat face attached to said movable member, a rack actuated by said movable member, a second rack actuated by said relatively long flat faced member, indicating means actuated by each of said racks for indicating weights of loads placed on said weighing mechanism, means whereby the indication actuated by said second rack may be caused to indicate an amount proportional to the amount indicated by said indicating means actuated by said first mentioned rack, said means comprising a lever, a fulcrum pivot for said lever, means on said lever for pivotally supporting said second rack at a fixed distance from said fulcrum pivot, a movable block secured to said lever, a pin fixed in said block for engaging said flat faced member secured to said movable member at a plurality of points variously spaced from said fulcrum pivot of said lever and manipulative means for moving said block and said pin relatively along the flat face of said flat faced member.

3. In a device of the class described, in combination, weighing mechanism, a movable member, a member having a relatively long flat face attached to said movable member, a rack actuated by said movable member, a second rack actuated by said relatively long flat faced member, indicating means actuated by each of said racks for indicating weights of loads placed on said weighing mechanism, means whereby the indication actuated by said second rack may be caused to indicate an amount proportional to the amount indicated by said indicating means actuated by said first mentioned rack, said means comprising a lever, a fulcrum pivot for said lever, means on said lever for pivotally supporting said second rack at a fixed distance from said fulcrum pivot, a movable block secured to said lever and a pin fixed in said block for engaging said flat faced member secured to said movable member at a plurality of points variously spaced from said fulcrum pivot of said lever.

4. In a device of the class described, in combination, weighing mechanism, a movable member, a member having a relatively long flat face attached to said movable member, a rack actuated by said movable member, a second rack actuated by said relatively long flat faced member, indicating means actuated by each of said racks for indicating weights of loads placed on said weighing mechanism, means whereby the indication actuated by said second rack may be caused to indicate an amount proportional to the amount indicated by said indicating means actuated by said first mentioned rack, said means comprising a lever, a fulcrum pivot for said lever and a member attached to engage said flat faced member secured to said movable member at a plurality of points variously spaced from said fulcrum pivot of said lever.

5. In a device of the class described, in combination, weighing mechanism, a movable member, a member having a track surface attached to said movable member, a rack actuated by said movable member, a second rack actuated by said track surface, indicating means actuated by each of said racks for indicating weights of loads placed on said weighing mechanism and means whereby the indication actuated by said second rack may be caused to indicate an amount proportional to the amount indicated by said indicating means actuated by said first mentioned rack.

6. In a device of the class described, in combination, weighing mechanism comprising load receiving means, load counterbalancing mechanism operatively connected thereto, means actuated thereby for indicating the weight of a load on said weighing mechanism, means cooperating with said load counterbalancing mechanism for indicating the sum of the weight of the load and a percentual fraction thereof, manipulative means for predetermining the percentual amount of said fraction, said means comprising a member on said load counterbalancing mechanism, said member having a track surface, a pivoted lever and an adjustable member on said lever for engaging said track surface, and graduated means on said lever for indicating the position of said adjustable member.

7. In a device of the class described, in combination, weighing mechanism including a movable member, a pair of movable indicators in axial alignment with each other and adapted to be actuated by said movable member, means for increasing the rate of movement of one of said indicators, means for locking said indicator and detaching said rate increasing means from said movable member, means for increasing said rate of movement comprising an independently fulcrumed multiplying lever and said locking means comprising a friction latch.

8. In a device of the class described, in combination, weighing mechanism comprising load receiving means, load counterbalancing mechanism operatively connected thereto, means actuated thereby for indicating the weight of a load on said weighing mechanism, means in cooperative relation to said load counterbalancing mechanism for indicating the sum of the weight of the load and a percentual fraction thereof and manipulative means for predetermining the percentual amount of said fraction, said means comprising a member on said load counterbalancing mechanism, said member having a track surface, a pivoted lever and an adjustable member on said lever for engaging said track surface.

9. In a device of the class described, in combination, weighing mechanism comprising load receiving means, load counterbalancing mechanism operatively connected thereto, means actuated thereby for indicating the weight of a load on said weighing mechanism, means in cooperative relation to said load counterbalancing mechanism for indicating the sum of the weight of the load and a percentual fraction thereof, manipulative means for predetermining the percentual amount of said fraction, said means comprising a member on said load counterbalancing mechanism, said member having a track surface, a pivoted lever, an adjustable member on said lever for engaging said track surface and means for locking said means in cooperative relation to said load counterbalancing mechanism for indicating the sum of the weight of the load and such percentual fraction and interrupting such cooperative relation.

HALVOR W. HEM.